April 29, 1952  E. B. HALES  2,594,769
LINEAR DETECTOR
Filed Sept. 30, 1948

Inventor
EVERETT B. HALES
By H. S. Mackey
Attorney

Patented Apr. 29, 1952

2,594,769

UNITED STATES PATENT OFFICE 2,594,769

LINEAR DETECTOR

Everett B. Hales, Mount Kisco, N. Y., assignor to General Precision Laboratory Incorporated, a corporation of New York Application September 30, 1948, Serial No. 51,973

4 Claims. (Cl. 250—27)

This invention relates to the quantitative detection of alternating voltages by the use of asymmetrical conductors, and particularly to the linear detection of small alternating voltages resulting in the production of representative direct voltage for purposes of accurate measurement.

One purpose of this invention is the provision of a linear detector of alternating voltages of intermediate frequencies for use in radio receivers, measuring instruments, computers, and other equipment of a precise nature.

Another purpose of this invention is to provide a highly accurate method of producing a direct voltage directly proportional to an alternating voltage.

Still another purpose of this invention is, to compensate for variations in cathode temperatures of the electronic tubes employed in the detector.

Previously existing types of detectors have been linear and stable only in a qualitative or roughly quantitative sense, or have had moving parts, such as choppers or vibrators. They also have been dependent in the maintenance of linearity on the use of regulated power supplies.

The instant invention may be used with unregulated power supplies for both plates and filaments, and its linearity is substantially independent of variations in the gain of the amplifier which it contains. Linearity is attained in spite of the use as a principal element in the detector, of a high vacuum diode or equivalent rectifier which has by itself a nonlinear characteristic. This detector automatically compensates for variation of diode (contact) potentials and has the useful qualities of high input impedance and low output impedance, thus avoiding any substantial loading of the input signal source and having enough output signal power to drive indicating, recording or computing equipment. The detector may also be made to have appreciable gain if desired. As an example of use, the detector of the instant invention can demodulate an alternating current voltage to a proportional direct voltage, the accuracy of this quantitative rectification being substantially independent of the voltage magnitude. An accuracy of better than 0.1% has been measured in test, and even higher accuracy may be attained.

This invention will be more readily understood from the following detailed description, considered together with the attached drawings, in which.

Figure 1:
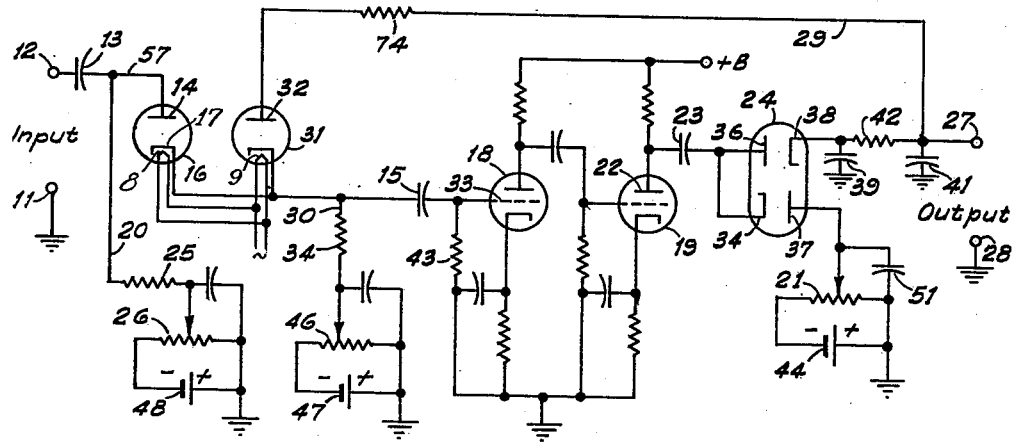
Figure 1 is a schematic wiring diagram of one form of the invention.

In Fig. 1 an input signal is introduced at terminals 11 and 12. This signal may consist of alternating current of any voltage, frequency and wave shape for which the circuit constants are suitable within the possible range of operation of electronic tubes and of rectifiers. The signal passes through a coupling condenser 13 to the plate 14 of an error-taking diode 16, where it is rectified, that positive portion which exceeds the tube bias being transmitted through a coupling condenser 15 to the grid 33 of an amplifier tube 18.

The error-taking rectifier 16 is preferably a high vacuum diode electronic tube, but it may alternatively be a rectifier of the crystal or dry disc type. Tube bias is applied through lead 20 and decoupling resistor 25 to the plate 14 from a source of negative direct voltage diagrammatically indicated by battery 48 and potentiometer 26, and bias is also applied to the cathode 17 through lead 30 and decoupling resistor 34 from a direct voltage source diagrammatically indicated by battery 47 and potentiometer 46. These biases are adjusted so that the smallest signals to be received will operate the device. The grid 33 of amplifier tube 18 is connected to ground by a grid leak resistor 43 for proper operation as an amplifier.

The feedback diode 31 introduces a negative feedback into the circuit at the cathode 17 of the error-taking diode 16, and the bias of the diode 31 is adjusted by means of potentiometer 46, which thus has a dual function. This bias is adjusted so that operation of tube 31 will be on the most favorable part of its characteristic curve.

The error-taking diode rectified signal is filtered by coupling condenser 15 and resistors 34 and 43, and the alternating component thereof as before stated actuates the grid 33 of the tube 18 which constitutes the first stage of a high-gain amplifier. Although this amplifier may be of any type it is preferably of the two-stage resistance-capacitance coupled type, as shown in Fig. 1. In general, the higher the gain of this amplifier, the greater will be the accuracy of the device. The amplifier also has a high input impedance to avoid loading the error-taking rectifier thereby reducing peak voltage and causing error in the final output. The amplifier has a relatively low output impedance to permit delivery of appreciable power to the detector which follows it. The first of the two amplifier stages shown in Fig. 1 should therefore preferably contain a high-mu triode to present a high input impedance and the second should preferably be a medium-mu triode to deliver a reasonable amount of output power.

The detector which follows the amplifier may be of any type which will demodulate or rectify the signal presented to it by the amplifier, such as a voltage-doubling dual-diode discharge tube, a single diode rectifier, a grid detector, plate detector or crystal rectifier, but should preferably present a low impedance to the utilizing equipment attached to its output terminals. The detector should include a filter of any type which will remove the alternating component and deliver direct current to the detector output terminals 27 and 28. This detector preferably consists, as shown in Fig. 1, of a voltage-doubling dual-diode discharge tube 24 followed by a filter consisting of a series resistor 42 and two shunt condensers 39 and 41.

The bias of the detector is adjusted by a potentiometer 21 served by a source of negative potential diagrammatically represented by battery 44. One of the purposes of this adjustment is to neutralize the diode (contact) potentials of the two diodes so that the no-signal potential of output terminal 27 will be that of ground.

The manner in which detector tube 24 acts as a voltage doubler is as follows:

Alternating voltage at the plate 22 of the amplifier tube 19 is impressed during one half cycle through a large condenser 51, diode plate 37 and cathode 34 on condenser 23, charging it to crest potential. During the following half cycle the voltage of this condenser is added to the impressed voltage in the circuit of anode 36, cathode 38 and condenser 39, causing condenser 41 and the output terminals 27 and 28 to be charged to approximately twice the crest alternating voltage, assuming a normally high load impedance.

The signal produced at output terminals 27 and 28 is as so far described dependent on the strength of the input signal at terminals 11 and 12 but is by no means proportional to it. The error-taking rectifier, the amplifier and the detector all have nonlinear characteristics and the output will vary with changes in plate supply voltage and with changes in the error-taking rectifier heater supply voltage.

In order to secure an output strictly linear with respect to the input and independent of plate supply voltage and heater voltage changes, negative feedback is introduced through lead 29. A portion of the output voltage is fed from terminal 27 through a feedback coupling diode 31 to the cathode 17 of the error-taking diode 16. This results in a strict proportionality between the peak value of the alternating current input potential and the direct current output potential.

Figure 2:
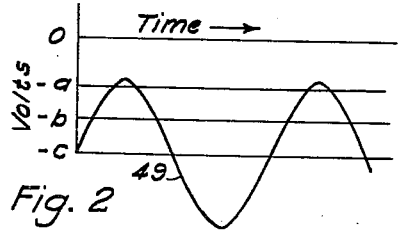
Figure 2 illustrates graphically the operation of the error-taking rectifier.

The manner by which this is accomplished may be better understood by referring to Fig. 2. An alternating voltage input signal is indicated in Fig. 2 as curve 49. In the absence of conduction by the tube 16, Fig. 1, this input voltage on plate 14 would be symmetrical about some bias voltage $-c$, Fig. 2, determined by the setting of potentiometer 26. The potential of cathode 17, if made slightly more positive than that of plate 14 by adjustment of potentiometer 46, is represented in Fig. 2 by the line $-b$. Since a diode will not conduct until its plate is made positive enough compared to its cathode to overcome the inherent diode (contact) potential, only that part of curve 49 which is more positive than potential $-b$ will pass through the diode to grid 33 of amplifier 18. This action occurs in absence of feedback, but the current passed does not have exactly the form of voltage curve 49, because the current-voltage tube characteristic curve of diode 16 is not straight, hence the input to the amplifier, and its demodulated output at terminals 27 and 28, will by no means be proportional to the peak voltage of curve 49. However, the potential at terminal 27 is fed back to cathode 17 through the diode 31, which in this action serves as a decoupling resistor, increasing the positive potential of cathode 17 toward the line $-a$ in Fig. 2. This is a self-limiting action, since this feedback reduces the output of diode 16 until only a very small signal is furnished to the amplifier, and the feedback thus limited is unable to force cathode 17 any further positive. The amount which is used of the peak of each positive half cycle may be made as small as desired by increasing the gain of the amplifier and therefore the potential of the signal input to the amplifier may be made as nearly accurately representative of the peak potential of the alternating input signal at terminal 12 as desired.

That this is so may be seen from an anlysis of the feedback action. Let the alternating input voltage at terminals 11 and 12 and at plate 14 be $E_i$ and let the direct feedback voltage supplied through tube 31 to cathode 17 be $E_F$. In operation, $E_F$ raises the positive potential of cathode 17 so that only the positive peaks of input signal exceeding the potential of cathode 17 plus the inherent diode potential may pass to grid 33 of tube 18. The value of $E_F$ rises until a stationary condition is reached when only a very small amount of the positive peak of each signal is passed. The value of this signal, $E_i - E_F$, is impressed on grid 33. If this value be termed $E_g$, then the relation $E_g = E_i - E_o$ would be true except for the fact that the value of $E_g$ depends on the part of the characteristic curve of tube 16 at which it is working, so that $E_g$ will vary in a complicated way depending on the strength of the signal $E_i$. Representing the function by $f$, $E_g = f(E_i - E_F)$. If the output voltage at terminals 27 and 28 be represented by $E_o$, $E_o$ will equal $GE_g$, if $G$ be the gain of amplifier and detector. If in Fig. 1 the resistance of resistor 74 is zero, then the negative feedback voltage $E_F$ will be equal to the output voltage $E_o$, so that $E_o = Gf(E_i - E_o)$. The effects of nonlinearity of the error-taking rectifier, amplifier, and detector on the linearity of the entire device may be evaluated without knowing the exact form of the function $f(E_i - E_o)$ by assuming that it is a simple multiple of $(E_i - E_o)$, or that $f(E_i - E_o) = F(E_i - E_o)$ where $F$ is a numerical factor. Then $$E_o = GF(E_i - E_o)$$

or $$E_o = E_i \left[ \frac{GF}{(1+GF)} \right]$$

If the gain be infinite, therefore $E_o = E_i$ exactly regardless of the value of $F$, and for reasonable amounts of gain $E_o$ will be very nearly equal to $E_i$. Reasonable values of resistors 34 and 43 and of the impedance of diode 31, all of which appear effectively in parallel to the amplifier input signal, and of the impedance of diode 16 throughout its characteristic curve give an actual value for $F$ in the neighborhood of .9 or .95. Substitution in the above equation shows that variation from .9 to 1 will have only a slight effect on the linearity of the device.

In any amplifier the gain, G, may vary somewhat with the magnitude of signal. In the present example G has been defined to cover the total gain of both amplifier and detector, both of which gains may be variable with magnitude of signal. However, the above analysis indicates that as the amount of gain increases, any variation of gain with signal produces less and less error. Therefore, by use of a high gain amplifier the nonlinearity resulting from the individual aberrations of diode, amplifier, and detector may be made as small as desired, and linearity is practically independent of changes in gain.

Figure 3:
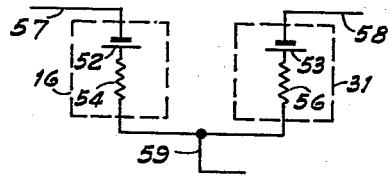
Figure 3 is the equivalent circuit of the error-taking rectifier and feedback diode.

The diode 31 as before mentioned, introduces the feedback voltage to the error-taking rectifier 16. In introducing the feedback voltage in this manner diode 31 serves as a decoupling element and also compensates for measurement error which would otherwise be caused by variations in diode 16 heater voltage. As an illustration of how this compensation occurs, let diodes 16 and 31 when in a conducting condition be represented by the equivalent circuit shown in Fig. 3, where the battery 52 represents the inherent diode potential of diode 16 and battery 53 that of diode 31. Resistors 54 and 56 represent the internal impedances of the diodes, but they are so low compared with other associated impedances in this circuit that variations in them may be disregarded. The diode potentials are approximately equal to each other and have a magnitude depending on the cathode temperatures, therefore on the heat voltages. These potentials are of a magnitude of one to two volts and a variation of ¼ volt may easily result from a change in heater voltage, so that such a variation in the internal potential of diode 16 is a possible source of first-order error and cannot be disregarded. It is almost perfectly compensated, however, by the use of diode 31 as follows. Let it be considered that all bias voltages have been correctly set and that signals being received through lead 57 by the plate of diode 16, represented in Fig. 3 by battery 52, are partly negatived by negative feedback consisting of a positive direct current potential received through lead 58, and that the difference is passed on to the amplifier through lead 59. If the heater voltage of diode 16 should fall, fewer electrons would be emitted from the cathode, resulting in a lower diode potential. A smaller signal would then be passed, which would cause a spurious decrease in output did not the following action occur. This action consists of a similar reduction in diode 31 heater voltage, both diode heaters 8 and 9 being connected to the same source. This reduces the number of electrons emitted by the cathode of diode 31, resulting in a lowering of the contact diode potential and a consequent decrease in the amount of feedback voltage effective at cathode 17. This decrease of feedback voltage will be exactly enough to neutralize the decrease in voltage of the diode 16, resulting in a zero change in output on lead 59, within limits of similarity of the potentials 52 and 53.

Diode 31 has the additional function of coupling the feedback voltage to error-taking diode 16 in such a way that substantially no signal energy is lost, since positive pulses of input signal cannot travel from cathode to plate in diode 31.

Figure 4:
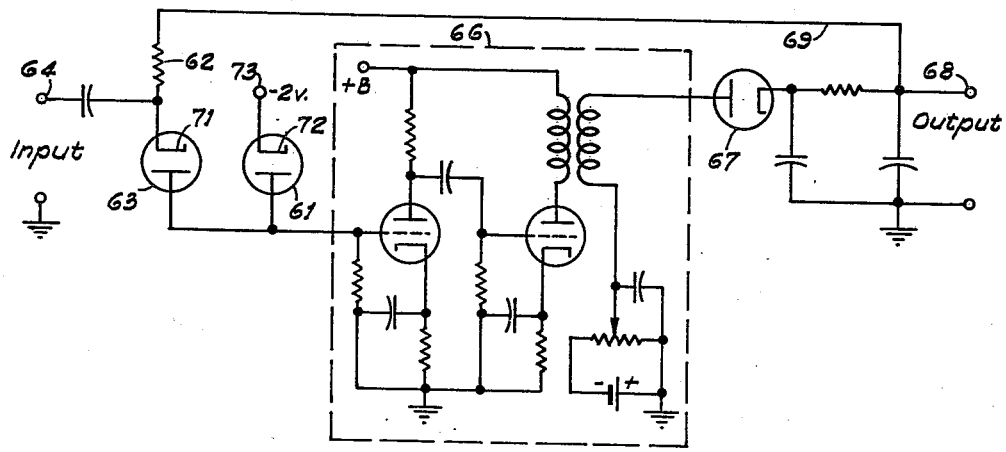
Figure 4 is a schematic wiring diagram of a second form of the invention.

Other configurations of the error-taking rectifier which may be used comprise designs which reverse its polarity, which apply the feedback on the input side instead of as described in the output side, or which separate the two previously-described functions of the feedback diode. For example, Fig. 4 shows an arrangement in which the cathode 71 of the error-taking diode 63 is presented to the incoming signal. Also diode 61 has only the single function of compensating for heater temperature variations while the inverse feedback is accomplished through attachment of a decoupling resistor 62 at the input side of the error-taking diode fed from output terminal 68.

With these differences operation is similar to that previously described and is briefly as follows. Positive half waves of input signals at terminal 64 cannot pass through diode 63. Negative half waves, however, do pass through, are amplified in two-stage amplifier 66, detected by diode 67, and filtered to direct potential at output terminal 68. Lead 69 from output terminal 68 carrying a positive potential of amount representative of the magnitude of the input signal, is fed back through resistor 62 to cathode 71 of the error-taking rectifier. This prevents all but the tips of the negative half-cycles of input signal from passing. These tips override the feedback voltage and energize the amplifier, so that the output is truly representative of the peak input voltage. Cathode 72 of the correction diode 61 is supplied with such fixed negative potential at terminal 73 as to operate diode 61 at a desired point on its characteristic curve. Then changes in output caused by changes in the heater of voltage of tube 63 are neutralized as described in connection with Fig. 1.

It was stated in connection with Fig. 1 that if the amplifier has infinite gain the direct current output signal potential will equal the input peak potential. This is also true in Fig. 4. However, if resistance be placed in the feedback loop of either figure, such as at resistor 74, Fig. 1, a positive gain greater than 1 will result. This is obvious from the equation previously given for output voltage $E_o$, which becomes $$E_o = E_i \left[ \frac{FG}{1+FGr} \right]$$

when $r$ is the ratio that the negative feedback voltage bears to the output voltage. Thus as the feedback voltage is reduced the output voltage rises in almost direct proportion.

What is claimed is:

1. A linear detector comprising a diode rectifier having its anode connected to a source of signals to be detected and its cathode connected to the input of a high gain amplifier for transmitting only positive portions of said signals to said amplifier for amplification thereby, a demodulator connected to the output of said amplifier converting the transmitted and amplified portions of said signals to a direct current potential, an output circuit connected thereto, a direct current feedback circuit connected between a positive terminal of said output circuit and the cathode of said diode rectifier whereby the potential of said diode cathode is varied in accordance with said output potential and only the positive peaks of said input signals are transmitted by said diode rectifier, said feedback circuit including a second diode having its anode connected to said output circuit and its cathode connected to the cathode of said diode rectifier, and a common supply source energizing the heaters of said diode rectifier and said second diode whereby the diode potentials of said diode rectifier and said second diode are varied equally by any change in potential of said supply source.

2. A linear detector in accordance with claim 1 in which said feedback circuit additionally includes an impedance.

3. A linear detector comprising, a diode rectifier connected to a source of signals to be detected and transmitting a portion of the signals impressed thereon, means for amplifying the portion of the signals transmitted by said rectifier, a demodulator connected to said amplifying means converting said transmitted and amplified signals to a unidirectional potential, an output circuit connected thereto, a feedback circuit connected between said output circuit and an electrode of said diode rectifier for impressing the unidirectional output potential on said rectifier in such a sense that only the peak values of the input signals are transmitted thereby and means connected to said diode rectifier for compensating for variation in the contact potential thereof with variation of its heater voltage said last mentioned means comprising a second diode connected in series in said feedback circuit and having its electrodes connected in opposition to the electrodes of said first mentioned diode.

4. A linear detector comprising, a diode rectifier having its anode connected to a source of signals to be detected and its cathode connected to the input of a high gain amplifier for transmitting only positive portions of said signal to said amplifier for amplification thereby, a demodulator connected to the output of said amplifier converting the transmitted and amplified portions of said signals to a direct current potential, an output circuit connected thereto, a direct current feedback circuit connected between said output circuit and the cathode of said diode rectifier including a resistor and a second diode connected in series, said second diode having its cathode connected to the cathode of said rectifier and its anode connected to one terminal of said resistor.

EVERETT B. HALES.

REFERENCES CITED

The following references are of record in the file of this patent:

UNITED STATES PATENTS

| Number    | Name            | Date           |
|-----------|-----------------|----------------|
| 2,130,441 | Wohlfarth et al | Sept. 20, 1938 |
| 2,137,846 | Klutke          | Nov. 22, 1938  |
| 2,243,141 | Weagant         | May 27, 1941   |
| 2,294,065 | Anderson        | Aug. 25, 1942  |
| 2,315,442 | McRae           | Mar. 30, 1943  |
| 2,362,503 | Scott           | Nov. 14, 1944  |

OTHER REFERENCES

"An Automatic Slideback Peak Voltmeter for Measuring Pulses" by Creveling and Mautner; vol. 35, No. 2 of IRE for 1947 (February).